US010082936B1

(12) United States Patent
Dillon et al.

(10) Patent No.: US 10,082,936 B1
(45) Date of Patent: Sep. 25, 2018

(54) HANDEDNESS DETERMINATIONS FOR ELECTRONIC DEVICES

(71) Applicant: Amazon Technologies, Inc., Reno, NV (US)

(72) Inventors: Michael Joseph Dillon, Seattle, WA (US); Steven Scott Noble, Soquel, CA (US); Paul Aksenti Savastinuk, Shoreline, WA (US); Ross David Roessler, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 773 days.

(21) Appl. No.: 14/527,460

(22) Filed: Oct. 29, 2014

(51) Int. Cl.
| G06F 3/041 | (2006.01) |
| G06F 3/0484 | (2013.01) |
| G06F 3/01 | (2006.01) |
| G06G 7/188 | (2006.01) |
| G06F 3/0488 | (2013.01) |

(52) U.S. Cl.
CPC ............ *G06F 3/0484* (2013.01); *G06F 3/017* (2013.01); *G06F 3/0416* (2013.01); *G06F 3/0488* (2013.01); *G06G 7/188* (2013.01)

(58) Field of Classification Search
CPC .... G06F 3/0488; G06F 3/0481; G06F 3/0482; G06F 3/04886
USPC .................................................. 345/156–173
See application file for complete search history.

(56) References Cited

U.S. PATENT DOCUMENTS

| 6,442,561 B1 * | 8/2002 | Gehrke ............. G06F 17/30705 |
| | | 707/776 |
| 8,665,238 B1 * | 3/2014 | Gossweiler, III ..... G06F 3/0488 |
| | | 345/173 |
| 2004/0227728 A1 * | 11/2004 | McAlindon ........... G06F 3/0202 |
| | | 345/156 |
| 2005/0080517 A1 * | 4/2005 | Hiemer .................. G01C 25/00 |
| | | 701/1 |
| 2009/0278791 A1 * | 11/2009 | Slycke .................... A61B 5/103 |
| | | 345/156 |
| 2010/0095773 A1 * | 4/2010 | Shaw ..................... G06F 3/0346 |
| | | 73/514.31 |
| 2011/0158473 A1 * | 6/2011 | Sun ..................... H04N 5/23248 |
| | | 382/103 |
| 2013/0035139 A1 * | 2/2013 | Sheynblat ............. G06F 1/1626 |
| | | 455/566 |
| 2013/0151195 A1 * | 6/2013 | Marinoni ............... G06F 3/0346 |
| | | 702/151 |

(Continued)

*Primary Examiner* — Stacy Khoo
(74) *Attorney, Agent, or Firm* — Pierce Atwood LLP

(57) ABSTRACT

The hand which a user is using to hold an electronic device can be determined by analyzing data captured by one or more motion sensors on the device. The curvature to the motion can be indicative of handedness, and processing motion features using a classifier algorithm can enable the determination of handedness with a corresponding confidence. In some embodiments, motion data is collected over a monitoring window, and handedness values are accepted when the handedness value remains the same with at least a minimum confidence for at least a minimum number of window periods. A determination of handedness enables an operating system and/or applications executing on the device to adjust one or more operational or interface aspects in order to make it easier for the user to operate the device using the hand currently holding the device.

21 Claims, 9 Drawing Sheets

(56) References Cited

U.S. PATENT DOCUMENTS

2015/0205946 A1\* 7/2015 Aurongzeb ............. G06F 3/017
                                                   726/19
2016/0018960 A1\* 1/2016 Feng ................... G06F 3/04883
                                                   715/763

\* cited by examiner

HANDEDNESS DETERMINATIONS FOR ELECTRONIC DEVICES

BACKGROUND

People are increasingly relying on portable computing devices for a variety of different tasks. Many of these tasks involve functions that can be performed with a user navigating to a specific location or interface to select a specific function. It is often the case, however, that users have difficulty in navigating to specific locations on a touch screen of a portable computing device. For example, a user holding the device in his or her left hand may have trouble selecting elements towards the right edge of a touchscreen of the device, as the locations of those elements can require the user to stretch to reach those elements, and users with shorter thumbs may not be able to select those elements as accurately as elements near the position of the user's thumb. Users holding the device in the right hand might have a similar problem with elements towards the left edge of the touchscreen. Current devices do not have sufficient capability of determining the handedness of a user in order to attempt to dynamically assist with handedness-related issues.

BRIEF DESCRIPTION OF THE DRAWINGS

Various embodiments in accordance with the present disclosure will be described with reference to the drawings, in which.

DETAILED DESCRIPTION

Approaches in accordance with various embodiments of the present disclosure overcome one or more of the aforementioned and other deficiencies experienced in conventional approaches to providing, or assisting in providing, information to an electronic device. In particular, approaches discussed herein enable the determination of the hand being used to hold a device at any given time, or the current "handedness." If it can be determined with at least a minimum confidence that a user is holding an electronic device in a left hand or a right hand, one or more aspects of an interface of the device can be adjusted, set, or otherwise specified in order to assist the user in performing one or more tasks using the determined hand. The interface aspects adjusted can include graphical interface aspects, or can correspond to other interface aspects, such as may involve motion and/or gesture detection. In at least some embodiments, motion data from at least one motion sensor can be analyzed over a window of time, and data for pairs of axes analyzed using a classifier algorithm to attempt to determine handedness based on patterns of motion. If handedness can be determined with at least a minimum level of confidence, at least one aspect of an interface for the device can be adjusted. This can include, for example, increasing the size of an action zone or moving one or more of the interface elements to be easier to select, among other such options. Adjusting an aspect might also include determining which cameras and/or patterns to use for gesture detection, as the hand of a user might obscure one or more cameras or change the pattern of motion slightly based on handedness.

Many other alternatives and variations are described and suggested below in relation to at least some of the various embodiments.

Figure 1A:
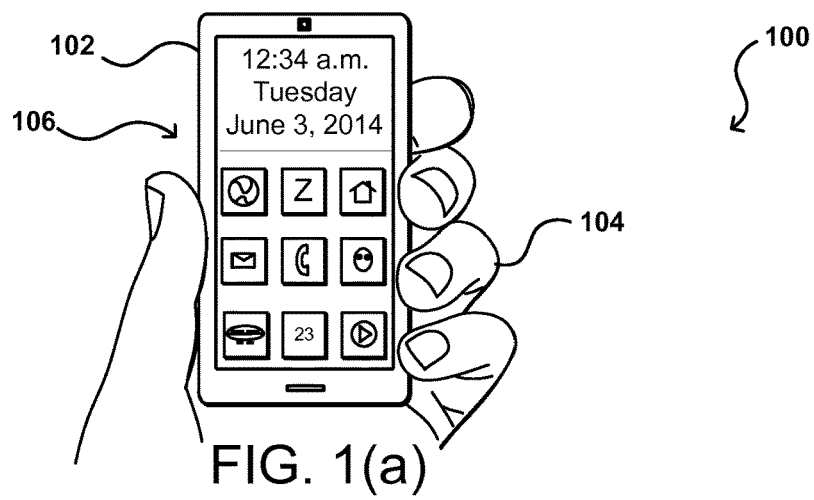
FIGS. 1(a), 1(b), and 1(c) illustrate an example approach to navigating an interface on a portable computing device in accordance with various embodiments.

FIG. 1(a) illustrates an example situation 100 wherein a user is interacting with a graphical user interface (GUI) 106 rendered on a computing device 102. The computing device 102 can be any appropriate device, such as a smart phone, tablet computer, wearable computer (e.g., smart watch or glasses), or personal data assistant, among other such options. In this example, the user is holding the computing device in one of the user's hands 104. If the user wants to navigate through the interface (i.e., a two-dimensional or three-dimensional interface) using a conventional approach, the user would typically touch the screen of the device, often near the edge of the screen, and swipe the user's thumb in a specific direction in order to scroll or navigate the displayed portion of the interface to be able to view the desired content. If the user wants to interact with that content, the user typically has to touch the representation of that content using the same thumb in a slightly different way, such as by holding for a period of time. Further as mentioned, the interface may not be a graphical interface or may include non-graphical aspects, as may relate to motion or gesture input. These can include, for example, detecting motions of the device or gesture of a user as input, among other such options.

Figure 1B:
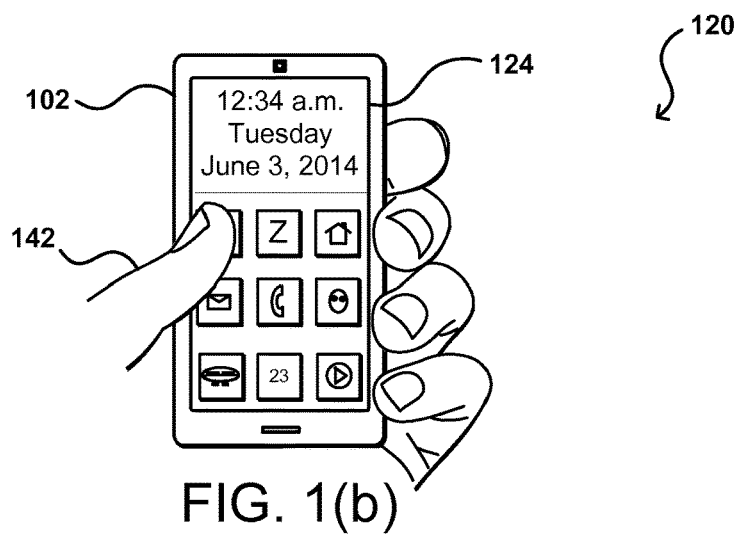
Figure 1C:
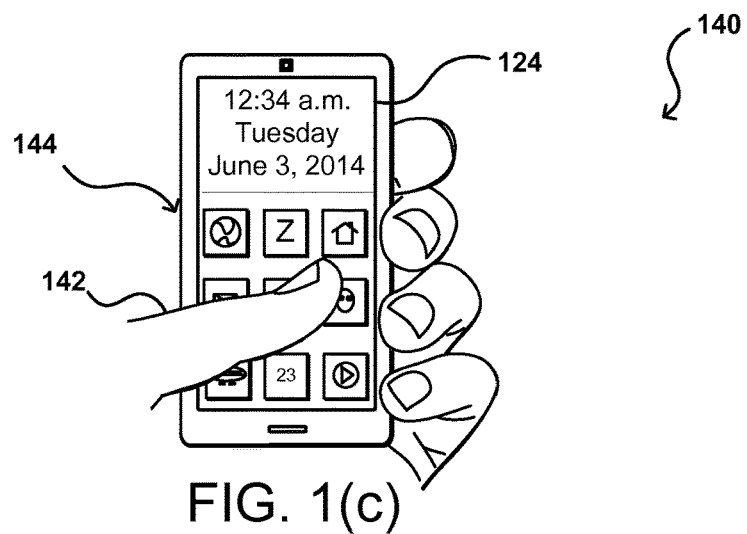

As illustrated in the example situation 120 of FIG. 1(b), the user may have a relatively easy time contacting positions that are near the user's thumb 142 when the user is operating the device using one-handed operation. Since the device is in the user's left hand in this example, the user can touch positions on the display screen 124 of the device 102 with relative accuracy when the positions are near the left edge of the display screen. As illustrated in the example situation 140 of FIG. 1(c), however, it may be difficult for the user to accurately touch positions on the display screen that are closer to the right edge of the screen 124, as the user may have to stretch the thumb across the screen and it can be harder for the user to precisely tap a position using the thumb when the surface of the thumb that the user will use to contact the screen is almost parallel to the screen (since the user has to stretch the thumb across the screen). In some instances, depending upon factors such as the size of the device with respect to the size of the user's thumb, the user might not even be able to reach a desired touch position. A similar problem exists when the user is holding the device in his or her right hand, except then the user might have problems accurately touching or reaching touch positions near the left edge of the display screen.

Accordingly, for at least these reasons it can be advantageous to determine the "handedness" in which the device is operating, or whether the user it holding the device in his or her right hand, or elsewhere (i.e., in both hands concurrently or in neither of the hands). The handedness can also potentially indicate that the user is likely not holding the device in either hand, but that the hand is on a surface or in a static holder, for example. It can also be advantageous to determine the confidence of the handedness determination, as a device might take certain actions if it can be determined, with at least a minimum level of confidence, that the device is being held in a right hand or a left hand, for example. Since users often switch hands while operating such a device, it can also be advantageous to update the handedness determination as appropriate.

Accordingly, approaches in accordance with various embodiments attempt to dynamically determine the handedness used to hold an electronic device, and update the handedness determination as appropriate. Confidence values can also be determined and provided in order to enable applications and/or services to determine whether or not to make an adjustment based on the handedness determinations. Such a process can operate continually, in response to detected device movement, or in other such situations as appropriate. Various approaches can be used to determine the motion of the device, as may include one or more motion sensors (e.g., accelerometers, gyroscopes, inertial sensors, or electronic compasses) or other components (e.g., cameras, proximity sensors, or light sensors), among other such options.

When a user holds an electronic device in one hand, the wrist of that hand constrains the possible motions. In other words, the wrist acts as a pivot point, such that if the user moves the device (consciously or subconsciously) the motion will tend to rotate, or move in an arc, about a point that is to the left of the device (for left handedness) or to the right of the device (for right handedness) even for small motions. By monitoring these motions over a period of time, it is possible to determine which hand the user is using to hold the device. In order to provide for more accurate determinations, it can be desirable to monitor the motion along three axes, or in three dimensions. Various approaches can be utilized to monitor and analyze the motion.

Figure 2A:
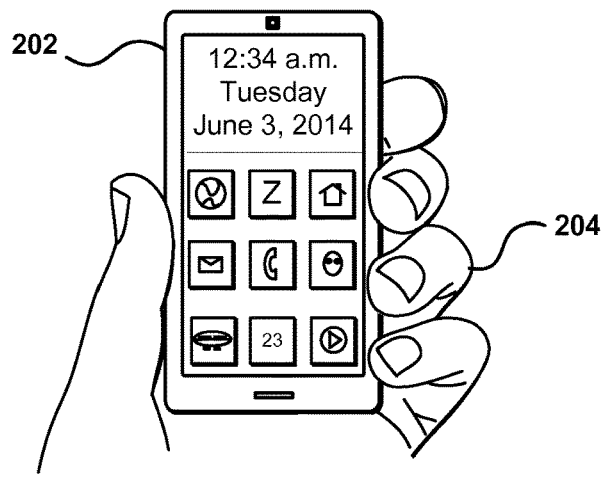
FIGS. 2(a), 2(b), and 2(c) illustrate an example path of motion for a device held in the left hand of a user that can be analyzed in accordance with various embodiments.
Figure 2B:
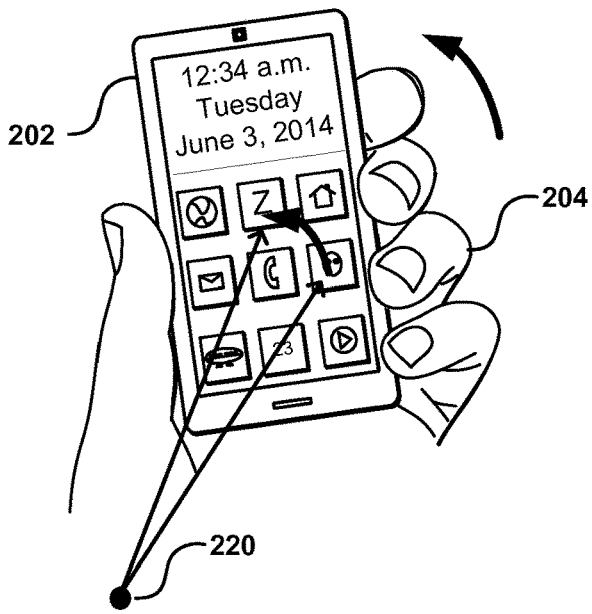
Figure 2C:
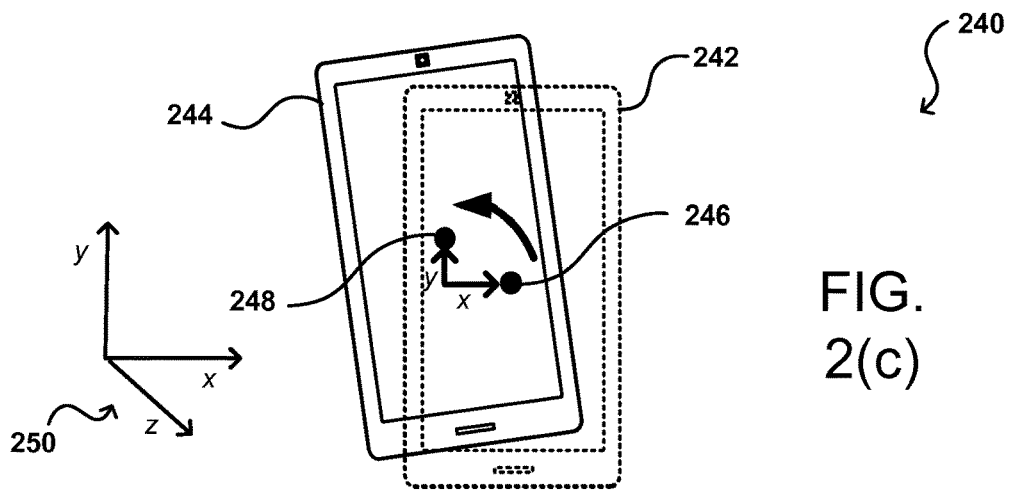

FIGS. 2(a) through 2(c) illustrate a first motion that can be utilized to determine handedness in accordance with various embodiments. In the example situation 200 of FIG. 2(a), the user is holding a computing device 202 in the user's left hand 204. If handedness monitoring or determination starts when the device is in this orientation, then this orientation can be used as the reference orientation in a world coordinate system. In the example situation 220 of FIG. 2(b), the user has attempted to move the device "up" in the plane of the figure. It should be understood that directional terms are used for purposes of explanation and are not intended to limit the scope of the various embodiments unless otherwise stated. Because the user is holding the device 202 in the user's left hand 204, the motion will not be a truly "upward" translation but instead will have a lateral (e.g., orthogonal) motion component as well due to the user's left wrist acting as a pivot point 220 as mentioned earlier. Thus, the motion will not be a linear motion but will actually follow an arc trajectory about an offset pivot point. The motion will then have a motion vector in each of at least two dimensions.

For example, consider the situation 240 illustrated in FIG. 2(c). The view 242 of the device with a dotted line shows the reference orientation where the device started during the monitoring window. The view 244 of the device with a solid line shows the final orientation at the end of the monitoring window. Assuming a reference point 246 in the center of the device in the reference orientation and a similar reference point 248 in the center of the device at the final orientation, it can be seen that the motion had motion not only "up" along the y-axis, as intended by the user, but also "left" along the x-axis due to the wrist acting as a pivot point. This example constrains the motion to two dimensions for purposes of simplicity of explanation, but it is possible that there was also some movement of the device, during the motion, in the z-direction. In this example, the motion is tracked with respect to a "world" coordinate system 250, which utilizes gravity as a reference. In some embodiments a reference system could be with respect to the device, and rotations or other motions could be monitored with respect to that coordinate system or reference system as well, among other such options.

Figure 3A:
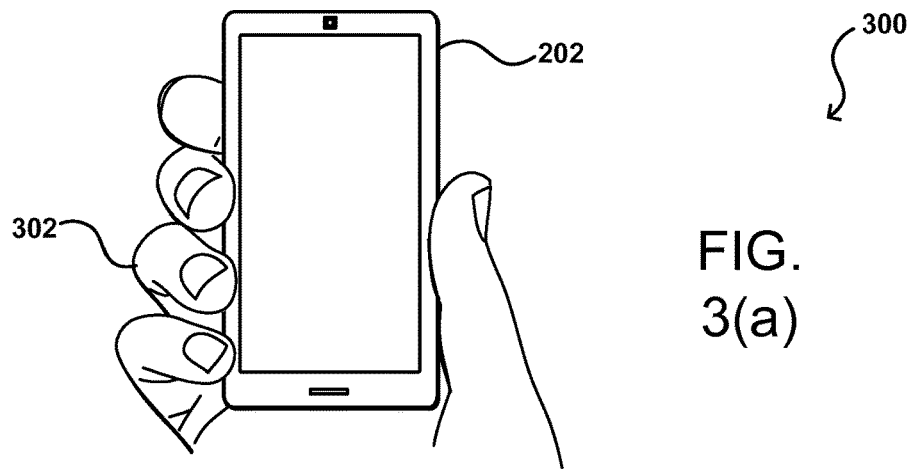
FIGS. 3(a), 3(b), and 3(c) illustrate an example path of motion for a device held in the right hand of a user that can be analyzed in accordance with various embodiments.
Figure 3B:
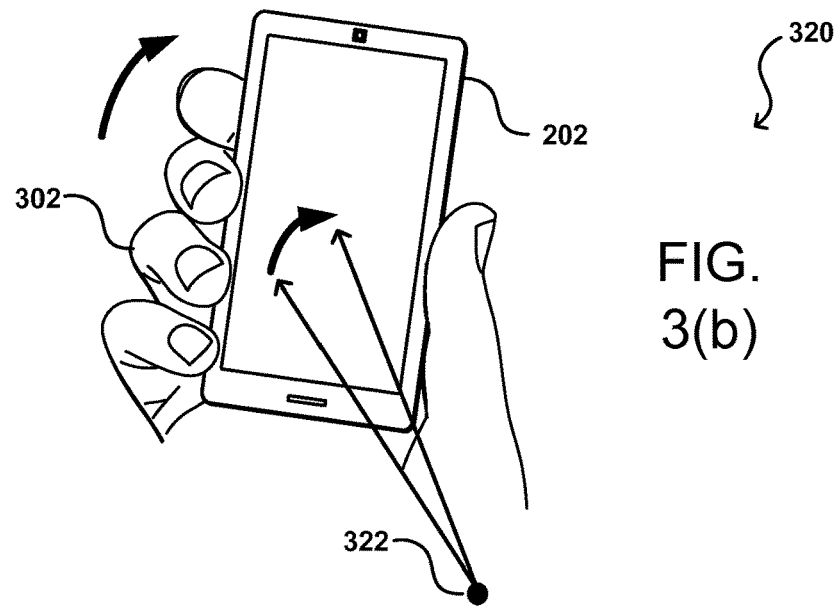
Figure 3C:
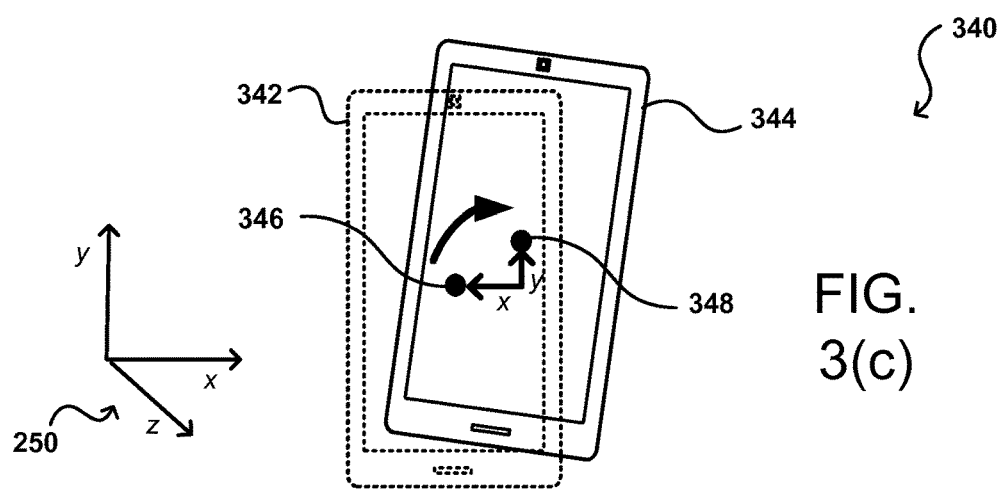

Similarly, a different motion is noted when the user attempts to perform the same intended movement of the device while holding the device 202 in the user's right hand 302, as illustrated in the example situation 300 of FIG. 3(a). It should be noted that reference numbers may be carried over between figures for purposes of simplicity of explanation, but that such usage should not be interpreted as a limitation on the scope of the various embodiments unless otherwise stated herein. Similar to the user holding the device in the left hand, the device is in a reference orientation at the beginning of the monitoring window. The motion of the device can be monitored over the monitoring window until the device 202 is at a final orientation at the end of the motion, as illustrated in the example situation 320 of FIG. 3(b). Since the device 202 is in the user's right hand in this example, the device moves about the pivot point 322 of the user's right wrist. Thus, by analyzing the motion as illustrated in the example situation 340 of FIG. 3(c), there is still an "up" y-axis motion from the center point 346 of the reference orientation view 342 to the center point 348 of the final orientation view 344 in the world reference coordinate system 250. Thus, the y-motion might be similar whether the user holds the device in the right hand or the left hand, but the motion in the x-direction would be essentially opposite for the different hands. Thus, by looking at changes such as a change in y/x or x/y, the value can be indicative of handedness for this particular motion. Similarly, if looking at purely rotation, the rotation can be in an opposite direction for a similarly intended movement of the device.

Figure 4A:
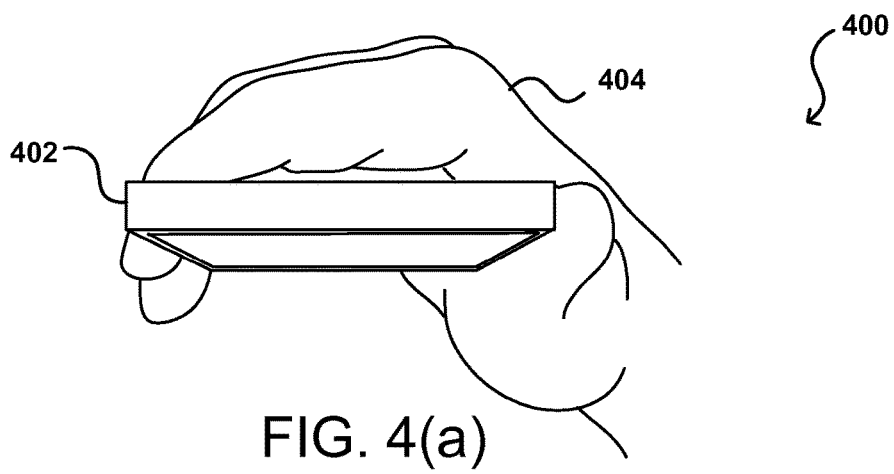
FIGS. 4(a), 4(b), and 4(c) illustrate another example path of motion for a device held in the right hand of a user that can be analyzed in accordance with various embodiments.
Figure 4B:
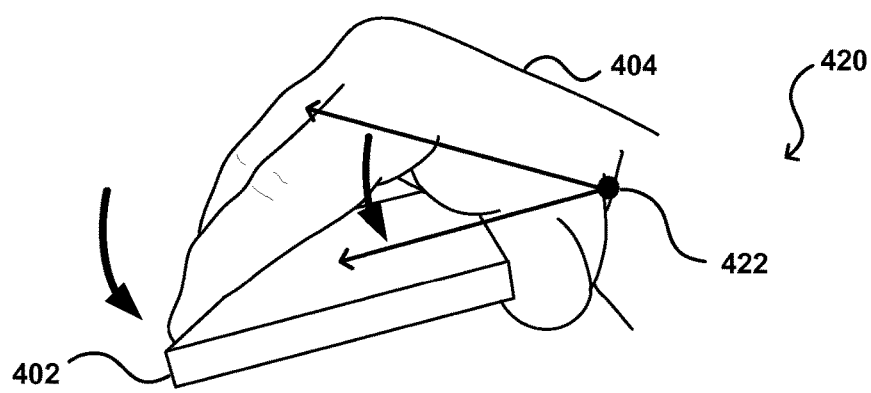
Figure 4C:
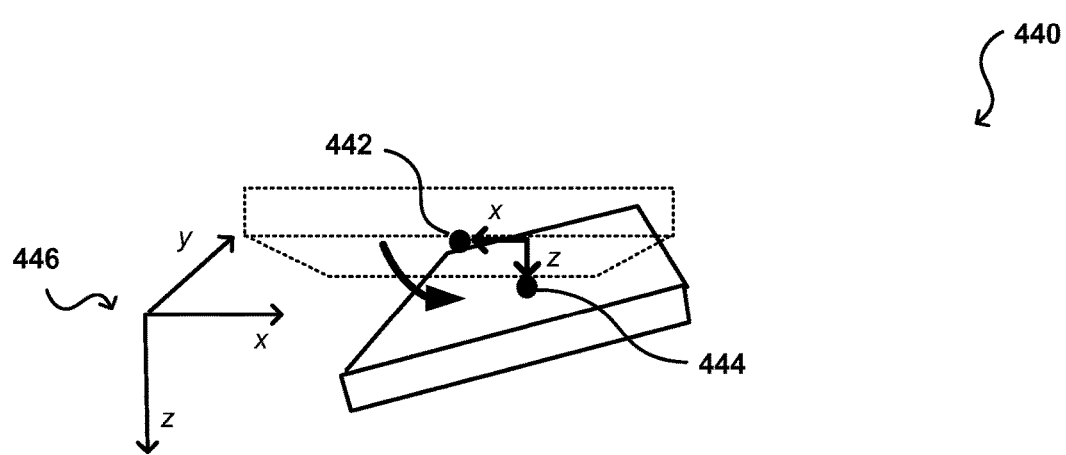

Similar effects can be detected in other directions and/or other dimensions as well. For example, the situation 400 illustrated in FIG. 4(a) shows a top view of a device 402 being held in the right hand 404 of a user. If the user intends to tilt the device forward (or "down" in the plane of the figure) there will still be some rotation due to the pivot point 422 of the wrist as illustrated in the example situation 420 of FIG. 4(b). Looking to the example situation 440 of FIG. 4(c), it can be seen that there is motion in the intended z-direction of the world reference coordinate system 446 from the center point 442 of the reference orientation to the center point 444 of the final orientation. Due to the pivot point of the right wrist, there is also some movement to the "right" along the x-axis. As with previous examples, the motion is limited to two dimensions for simplicity of explanation but the motion can be in three dimensions as well, and in this case the motion most likely would have a "down" motion along the y-axis as well. Thus, it may be beneficial to analyze the motion in all three axes, such as by analyzing the motion along each pair of axes, including x/y, y/z, and x/z for Cartesian coordinates as an example.

Figure 5A:
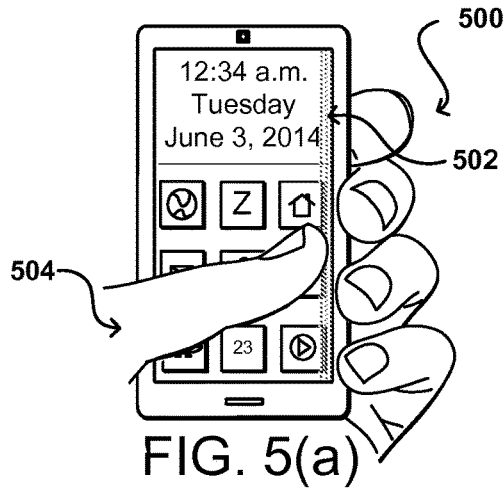
FIGS. 5(a), 5(b), 5(c), 5(d), 5(e), and 5(f) illustrate changes in interface aspects that can be implemented in response to a handedness determination in accordance with various embodiments.
Figure 5B:
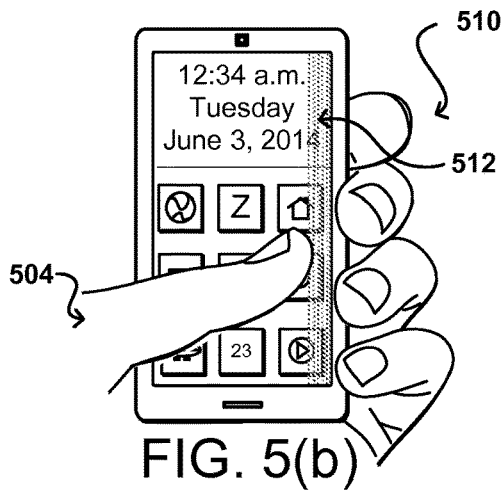

Being able to determine the handedness, or hand in which the user is holding the device, enables various actions to be taken on the computing device that can provide various benefits or advantages. For example, FIG. 5(a) illustrates an example situation 500 wherein a user is able to swipe between displayed pages (or bring into view side window panels, etc.) by contacting an action zone 502 with the user's thumb 504, for example, and dragging to the left to cause a page to appear to slide in from the right. If it is determined that the user is holding the device in the user's left hand, a larger action zone 512 can be utilized near the right edge of the display, as illustrated in the example situation 510 of FIG. 5(b). The larger zone enables the user to perform the desired action without needing to be as precise as to where the user contacts the touchscreen to perform the action, and enables a user whose thumb was previously too short to reach the action zone to reach the larger action zone and perform the desired task.

Figure 5C:
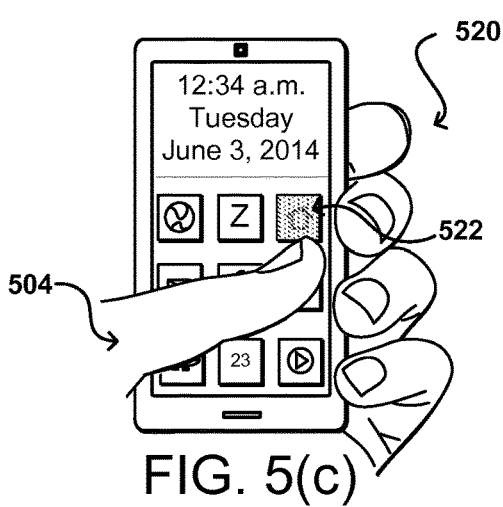
Figure 5D:
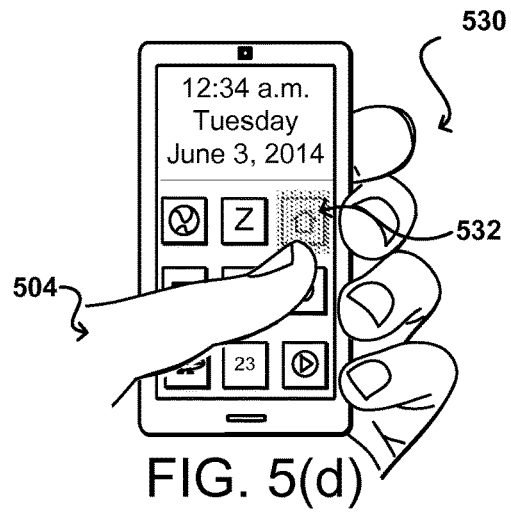
Figure 5E:
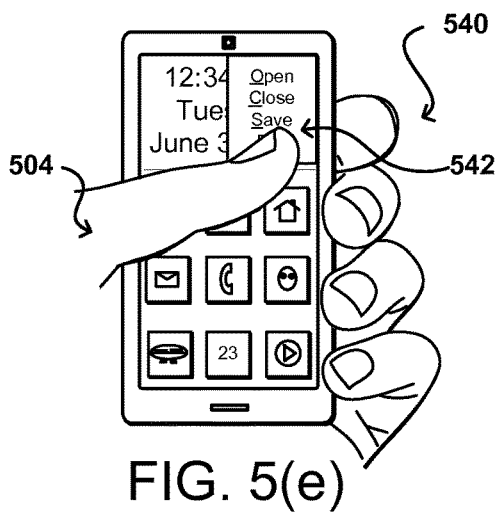
Figure 5F:
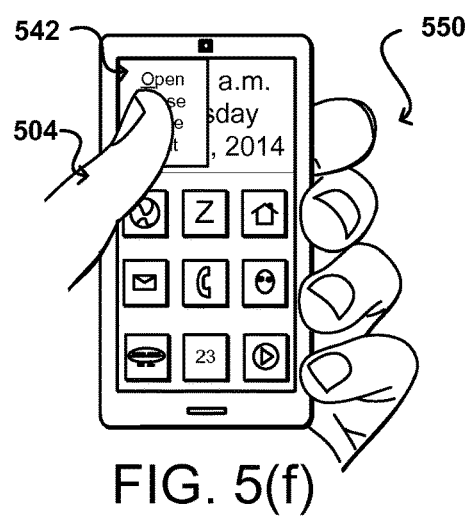

Other adjustments can be made to facilitate usage by the user once handedness is determined with a minimum level of confidence, which at least meets or satisfies a confidence threshold or confidence criterion. For example, in the situation 520 of FIG. 5(c) the default size of an action zone 522 for an application icon is illustrated, which a user can select by touching the touchscreen with the user's thumb 504 in a region of the touchscreen associated with the action zone (e.g., near pixels of the display associated with the icon). In the situation 530 of FIG. 5(d), it has been determined that the user is holding the device in the user's left hand, such that an enlarged action zone 532 might be utilized for icons or other user-selectable elements displayed near the right edge of the display. Similarly, in the example situation 540 of FIG. 5(e) a menu element 542 is by default displayed towards the right of the display screen, but if it is determined with sufficient confidence that the user is holding the device in the user's left hand, the menu element 542 can be moved to the left, as illustrated in the situation 550 of FIG. 5(f), enabling easier and/or more accurate access by the user using the thumb 504 on the user's left hand. Various other such options or actions can be taken as well as should be appreciated in light of the teachings and suggestions contained herein. While discussed with respect to the user interface and/or user experience, various other adjustments can be made as well where the handedness knowledge provides some advantage to be obtained by changing one or more aspects of the operation of the device.

Figure 6:
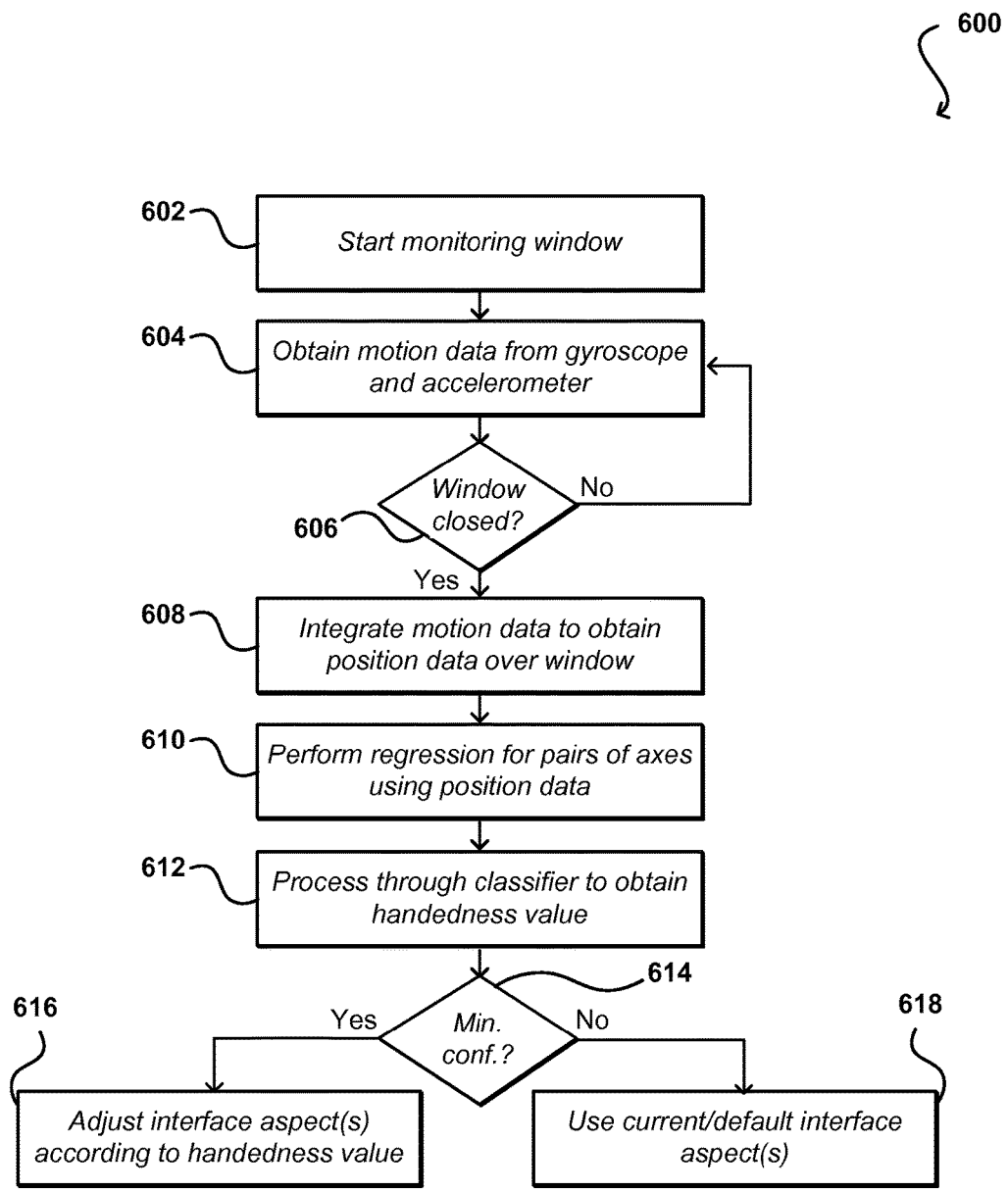
FIG. 6 illustrates a first example process for determining handedness of a user that can be utilized in accordance with various embodiments.

FIG. 6 illustrates an example process 600 for determining and utilizing the handedness of a user that can be utilized in accordance with various embodiments. It should be understood, however, that there can be additional, fewer, or alternative steps performed in similar or alternative orders, or in parallel, within the scope of the various embodiments unless otherwise stated. In this example, a monitoring window is started 602. The monitoring window can correspond to a period of time over which motion is to be monitored. The length of the monitoring window can be selected based upon a number of factors, such as the rate at which one or more sensors provides data, the number of data points desired, the response rate for handedness determinations and changes, and other such factors. For example, a gyroscope might provide data at a rate of one hundred values per second, such that a window of ten seconds might be determined to be appropriate in order to obtain a sufficient number of values while enabling handedness-dependent adjustments to be made sufficiently quickly so as to not negatively impact the user experience. Other data output rates, such as ten, fifty, or a thousand times a second can be handled as well, among others. Similarly, window periods on the order of milliseconds, seconds, or tens of seconds can be used as well, among others. The monitoring window can be started using any appropriate mechanism. For example, a minimum amount of motion detected by a device sensor might be sufficient to automatically trigger a monitoring window. In other embodiments, motion might be continually analyzed such that one window starts right after the other. In some embodiments, certain applications that utilize handedness data might start handedness windows when determined to be advantageous. Various other triggers can be utilized as well. Further, while a single ten second window is discussed herein, it should be understood that other window lengths, numbers, and combinations can be utilized as well, and that different applications or services might utilize different windows on the same device, etc.

During the period of the monitoring window, motion data can be obtained 604 from one or more motion sensors or other such device components, in this case including a gyroscope and an accelerometer. It should be understood, however, that various other types of sensors or components, such as inertial sensors, digital compasses, and cameras, can be used as well within the scope of the various embodiments. In this example, a gyroscope is used because a gyroscope provides rotation data in three dimensions. Because the computing device will typically rotate about a pivot point at a distance from the device, which will result in some translation as well as rotation, it can be desirable to utilize another motion sensor as well, such as an accelerometer. By combining the accelerometer data and gyroscope data, it is possible to generate a path of motion, including changes in orientation, of the device over the monitoring window. As long as the monitoring window is open, the obtaining of motion data can continue. Once the monitoring window is closed 606, motion data for that window can cease to be collected and the data analyzed.

Determining an entire path of motion, including rotation, can require more resources than are needed, however. An absolute wrist position or path of motion determination is not necessary, as the general curvature of motion is sufficient. Since the general curvature (based on rotation and translation) can be represented by movement in three dimensions, and handedness can be determined based upon the movement in these three dimensions, a simplified approach that consumes fewer resources (e.g., memory and processor capacity) can be utilized. In this example, the motion data is integrated 608 in order to obtain position data over that window. Since gyroscope data gives rotation, the gyroscope data can be integrated once to provide absolute change in rotation. Since accelerometer data gives acceleration, integrating twice can provide the absolute change in position. In this example, the data for each pair of axes can then be analyzed. The combination of absolute rotation and absolute translation defines an arc of motion that rotates about the pivot point, here corresponding to the user's wrist. Analysis thus can be performed on the x/y axis data, the y/z axis data, and the x/z axis data. These ratios provide the "slope" of the change over that period for each pair, and the combinations of these ratios can then be used to determine handedness based on this "average curvature" determination. In one example, machine learning feature extraction is performed on the pairs of data. This can include, for example, looking for values such as mean over the period, number of zero crossings, kurtosis, skew, or other such statistical values. A regression can be performed 610, such as may include a linear or non-linear (e.g., quadratic) regression, on the pairs as part of the feature generation and/or extraction, in order to determine how the slope changes, such as how the slope of x changes with y and with z. Such an approach helps to remove the curvature and provide clear information as to how motion along one axis changes with respect to motion along another axis. Different pairs may be used as well, such as may be appropriate for polar coordinate systems. Other curve-fitting approaches can be used as well within the scope of the various embodiments. Once these motion-related features are obtained, the features can be processed 612 using a classifier algorithm to obtain a handedness value. The classifier algorithm can be any appropriate algorithm, such as a boosted decision stump, decision tree, random forest, or neural net algorithm.

In at least some embodiments, the output of the classifier is a confidence value, although various other types of output can be provided as well. It may be desirable in many situations to have a continuous value, to provide a more granular handedness determination result, while in other situations a more binary output might be desired. In some embodiments, a handedness value output from the classifier algorithm might run from −1 to +1. A value of −1 might represent left handedness (holding the device in the left hand) with 100% confidence, and a value of +1 might represent right handedness with 100% confidence. A value of 0 then might represent that there is 0% confidence that the device is in one hand or the other, or may otherwise indicate that the device is elsewhere, such as being held in both hands or no hands (e.g., on a table), among other such options. A value of +0.5 might therefore indicate that there is 50% confidence that the user is holding the device in his or her right hand.

In another embodiment, the classifier might output three or more confidence values that add up to 100%. For example, the classifier algorithm might output the values 80%, 15%, and 5%. This might indicate, for example, that the classifier has determined that there is an 80% confidence that the device is in the user's right hand, 5% confidence that the device is in the user's left hand, and 15% confidence that the device is elsewhere (i.e., in both hands or no hand), or otherwise indeterminate. Values might also run from 0 to 1.0, where 0 indicates left handedness, 1.0 represents right handedness, and anything in-between is representative of the probability of being in the right hand or left hand. Various other values can be output, and other confidence values used, as well as should be apparent in light of the teachings and suggestions contained herein. For example, a third confidence value might indicate that the device is being held in both hands, while a fourth confidence value might indicate that the device is not being held in any hand, such as by being present on a table or desk. Sensors, cameras, and other mechanisms might be used to determine the presence on a flat surface as well, as may utilize lack of motion and direction of gravity, etc. Information captured by a camera or other sensor or component also can be used to assist with handedness determinations and different confidence values as well within the scope of the various embodiments.

In some embodiments, the operating system on the device can utilize this data to determine whether or not to adjust for handedness. In other embodiments, the handedness value(s) can be provided to various applications on the device, such as applications that have subscribed as listeners for the handedness data. Other approaches can be utilized as well. A determination can be made 614, for each application or service, for example, as to whether the handedness determination at least meets a minimum confidence threshold or otherwise satisfies a confidence criterion. The value can be the same for all applications, or each application may specify its own threshold or criterion. If handedness is determined with at least the minimum confidence threshold, such as at least 75%, 80%, or 90%, for example, then at least one interface aspect (or other functionality) of the device can be adjusted 616 according to the handedness value. As discussed, this can include changing the size of an action zone, moving one or more interface elements, updating a gesture recognition pattern, adjusting a motion input threshold, and the like. If the handedness value does not satisfy a confidence criterion, for example, then the current or default interface aspect(s) can be set, applied, or maintained, among other such options.

In some embodiments, there might be a sliding window or set of windows that are analyzed to provide a more continuous or consistent user experience. For example, a new determination every second might mean that elements changed size or location every second, which could negatively impact user experience due to false positives, etc. In some embodiments, a handedness determination might need to remain consistent for a period of time, such as at least five or ten seconds, before the aspects are updated, in order to be more confident that the handedness determination is correct. If the values fluctuate between low confidence values of left and right over that time period, an indeterminate result might also be provided. In many cases, even an improper handedness determination may not negatively impact the user experience too much as long as the adjustment is not too severe. For example, changing the size of an action zone for a side panel to be larger than normal may not make much difference unless the action zone affects the size or shape of another action zone or selectable element. Further, changing the location of a selectable element still enables that element to be selected even if it is less convenient than when in another position, etc.

Figure 7:
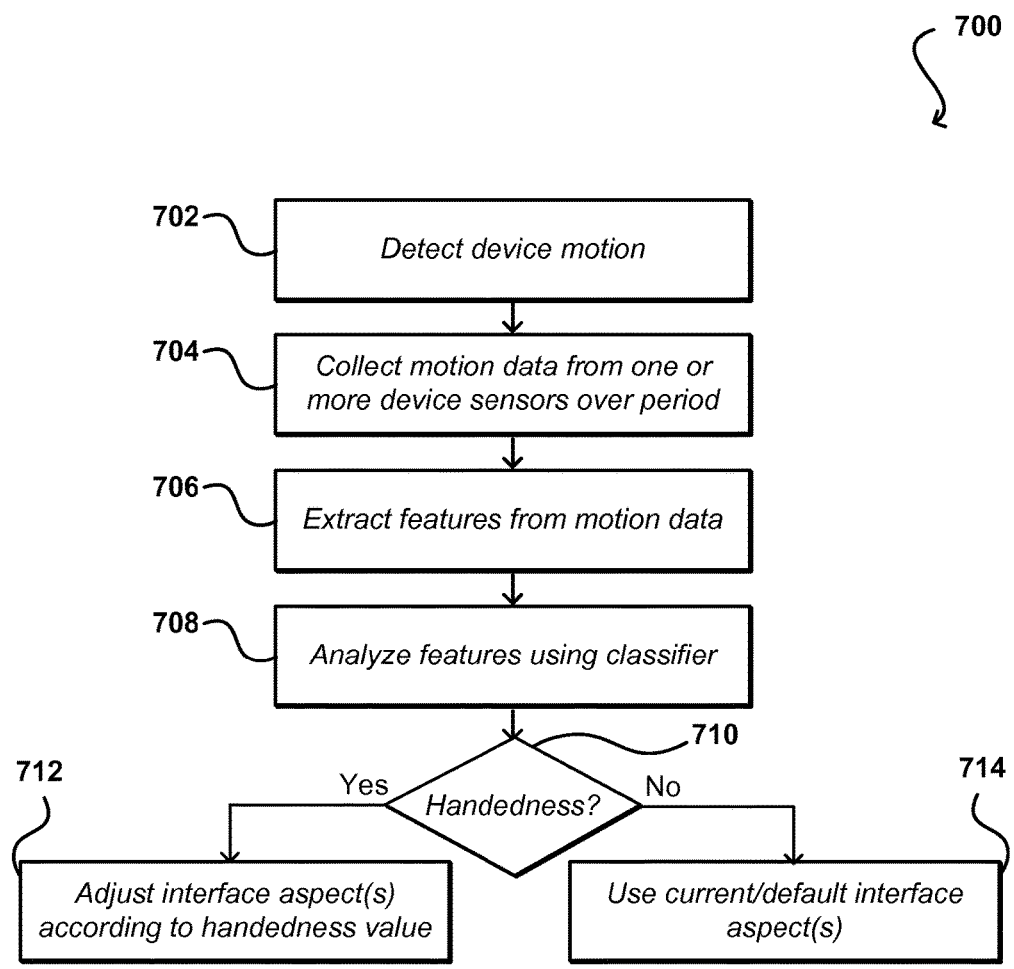
FIG. 7 illustrates a second example process for determining handedness of a user that can be utilized in accordance with various embodiments.

FIG. 7 illustrates another example process 700 for determining and utilizing handedness in accordance with various embodiments. In this example, device motion is detected 702, such as by using a motion sensor or analyzing image data captured by at least one camera of the device, among other such options. Motion data from one or more device sensors can be collected 704 over a period of time. As discussed, this can include rotation and/or translation data provided using at least one camera, inertial sensor, gyroscope, electronic compass, and/or accelerometer, among other such components. A set of features can be extracted 706, or otherwise determined, from at least the motion data. These features then can be analyzed 708 using at least one classifier algorithm to attempt to determine the handedness used to support the device, along with a relative confidence value. As mentioned, this can include looking at rotation and/or translation data and extracting motion features useful for the classifier algorithm. A determination is then made 710 as to whether the handedness is determinable with at least a minimum level of confidence. If so, one or more interface (or other operational) aspects of the device can be adjusted 712 according to the handedness determination. If not, the current or default aspects can be used, applied, or maintained 714 as discussed elsewhere herein.

In some embodiments, a process such as head tracking can be used to determine handedness as well. For example, small motions of the device will result in movement of features in the image about an arc, which can be used to determine handedness. Similarly, a user holding a device in the user's right hand is more likely to capture an image of the user's face from one side than the other, which can be indicative of handedness. In some embodiments where the device has multiple cameras at various locations on the device, the obscuring of specific cameras can be indicative of handedness. The shape of the contact area on a touchscreen can also be indicative of handedness, as the shape of the contact region of a thumb from the left side of the screen will be different than the contact region of a thumb from the right side of the screen. Various other approaches can be indicative of handedness as well. For each such determination, a separate classifier can be generated, or an overall classifier trained to accept data from any or all of these indicators. These additional data points then can be used to improve the accuracy of the handedness determinations discussed above.

Figure 8:
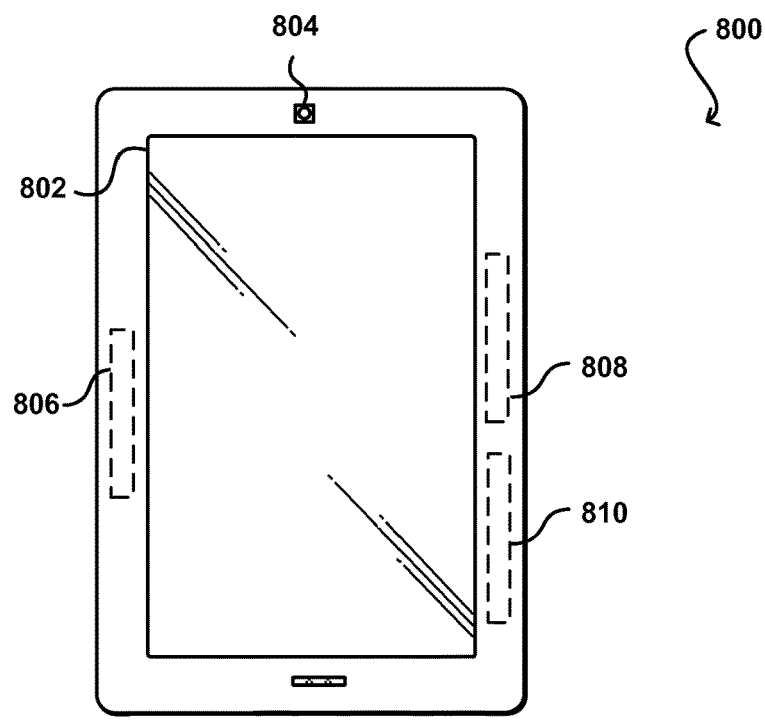
FIG. 8 illustrates an example computing device that can be utilized in accordance with various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 800 has a display screen 802 on the front side, which under normal operation will display information to a user facing the display screen (e.g., on the same side of the computing device as the display screen). The display screen can be a touch sensitive screen that utilizes a capacitive touch-based detection approach, for example, that enables the device to determine the location of an object within a distance of the display screen. The device also includes at least one communication component 806 operable to enable the device to communicate, via a wired and/or wireless connection, with another device, either directly or across at least one network, such as a cellular network, the Internet, a local area network (LAN), and the like. Some devices can include multiple discrete components for communicating over various communication channels.

The computing device in this example includes at least one camera 804 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video. The device can also include a light sensor and an illumination element, such as a white light or infrared (IR) LED for providing illumination to assist with image capture based at least in part upon current environmental conditions. The example computing device 800 can include at least one microphone or other audio capture device capable of capturing audio data, such as words or commands spoken by a user of the device. The computing device can also include one or more motion sensors or other such components. In this example the computing device includes an accelerometer 808 and an electronic gyroscope 810, although other motion sensors such as digital compasses and inertial sensors can be used as well as discussed elsewhere herein.

Figure 9:
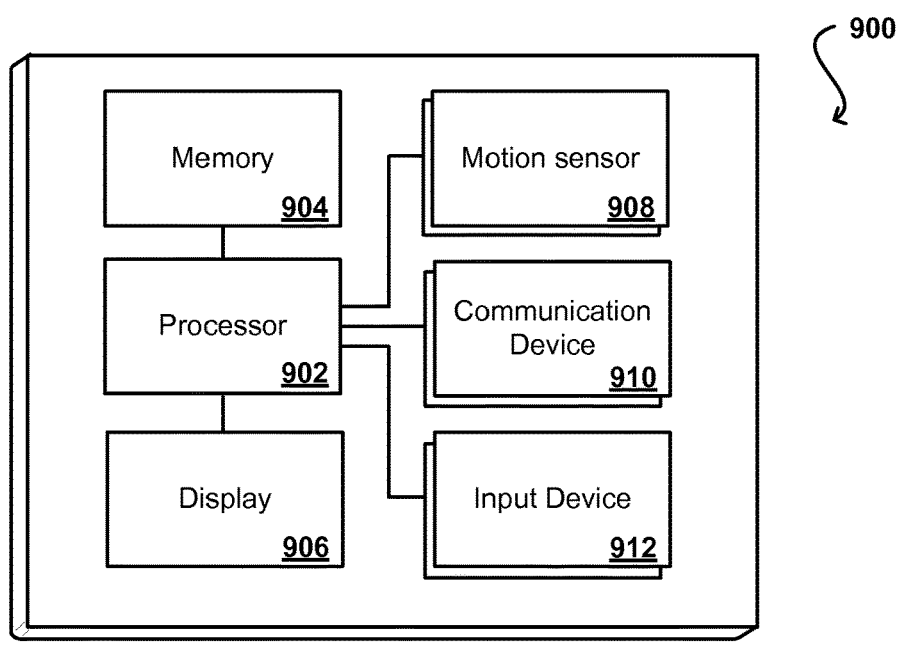
FIG. 9 illustrates an example set of components that can be utilized in a device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include one or more cameras or camera sensors for capturing image or video content. Such components can include at least one image capture element such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 900 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device can include one or more communication elements 910 or networking sub-systems, such as a Wi-Fi, Bluetooth, RF, wired, or wireless communication system. The device in many embodiments can communicate with a network, such as the Internet, and may be able to communicate with other such devices. In some embodiments the device can include at least one additional input device 912 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 900 also can include at least one orientation or motion sensor 908. Such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

Figure 10:
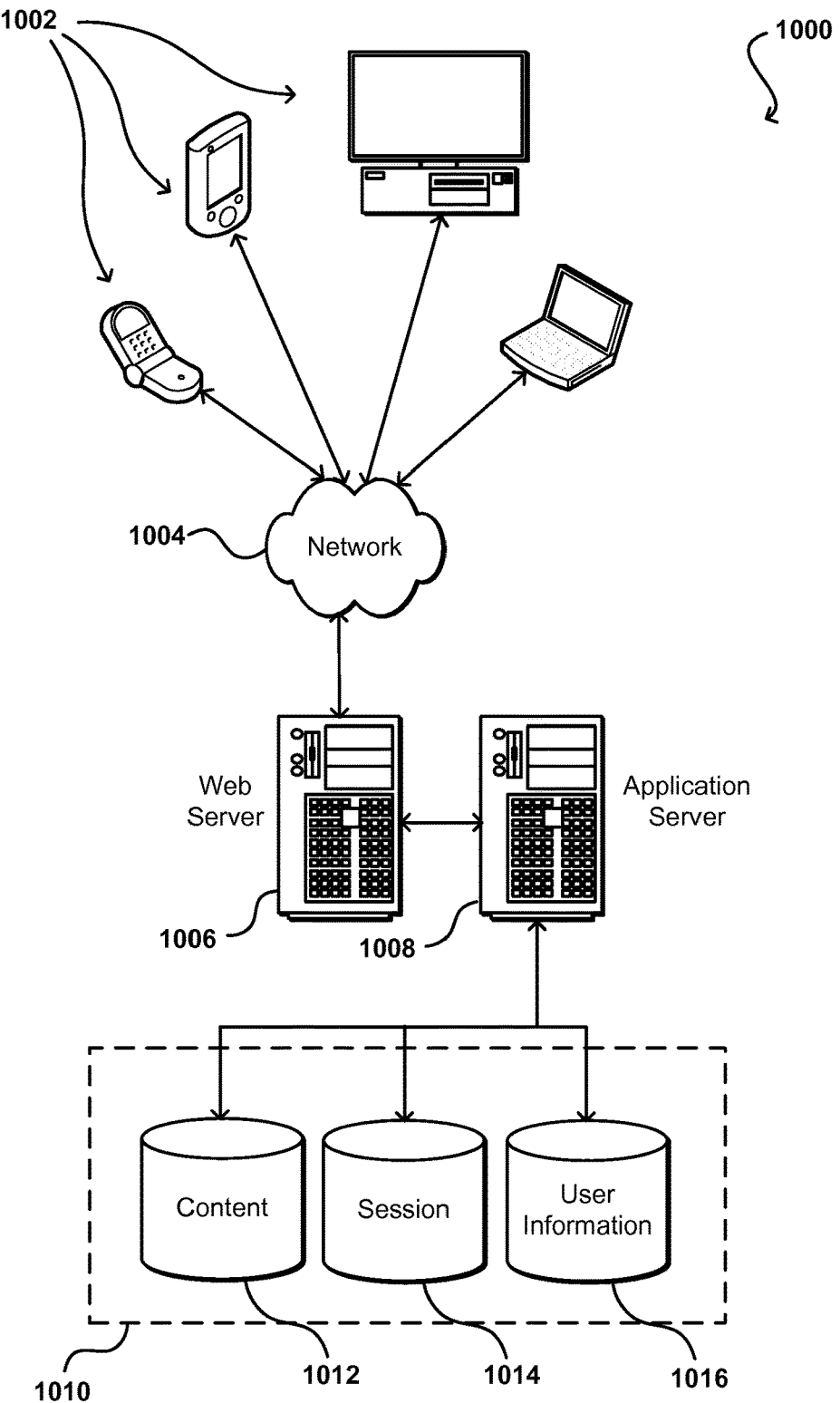
FIG. 10 illustrates an example an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a touchscreen;
   an electronic gyroscope;
   an accelerometer; and
   at least one memory comprising instructions that, when executed by the at least one processor, cause the computing device to:
      receive rotation data from the electronic gyroscope over a first period of time;
      receive acceleration data from the accelerometer over the first period of time;
      perform a first regression, using first data for motion, along a first axis with respect to a second axis to generate a first set of motion features;
      perform a second regression, using second data for motion, along the second axis with respect to a third axis to generate a second set of motion features, the first data and the second data derived from at least one of the rotation data or the acceleration data;
      process the first set of motion features and the second set of motion features using a classifier algorithm to determine a first confidence value that a user is holding the computing device in one of a left hand or a right hand;
      determine the first confidence value satisfies a confidence value threshold associated with either the left hand or the right hand; and
      based at least in part on the first confidence value satisfying the confidence value threshold, determine an aspect of a user interface.

2. The computing device of claim 1, wherein the at least one memory further comprises instructions that, when executed by the at least one processor, further cause the computing device to:
   perform a first mathematical integration of the rotation data to generate a first set of position data; and perform a second mathematical integration of the acceleration data to generate a second set of position data, the second mathematical integration involving a double mathematical integration,
wherein the first data and the second data are generated based at least in part on the first set of position data and the second set of position data.

3. The computing device of claim 1, wherein the at least one memory further comprises instructions that, when executed by the at least one processor, further cause the computing device to:
provide a set of three values adding up to one hundred percent, the set of three values including a second confidence value that the computing device is being held in the left hand, a third confidence value that the computing device is being held in the right hand, and a fourth confidence value that the computing device is elsewhere.

4. The computing device of claim 1, wherein the at least one memory further comprises instructions that, when executed by the at least one processor, further cause the computing device to:
determine a length of the first period of time based at least in part on at least one of a first data output rate of the electronic gyroscope or a second data output rate of the accelerometer, the length being sufficient to receive at least a minimum number of data points.

5. The computing device of claim 1, wherein the at least one memory further comprises instructions that, when executed by the at least one processor, further cause the computing device to:
determine a second confidence value for a second period of time;
determine the second confidence value satisfies a minimum confidence value for a common handedness determination; and
based at least in part on the second confidence value satisfying the minimum confidence value, adjust the aspect.

6. A computer-implemented method, comprising:
determining motion data over a period of time, the motion data associated with movement of a computing device, the motion data representing at least one of rotation data or acceleration data;
performing, using at least a portion of the motion data, a regression along a first axis with respect to at least a second axis;
determining, based at least in part on the regression, a set of motion features;
determining a confidence value associated with the set of motion features, the confidence value representing a likelihood that a user is holding the computing device in at least one of a left hand or a right hand;
determining the confidence value satisfies a confidence value threshold; and
based at least in part on the confidence value satisfying the confidence value threshold, setting functionality of the computing device.

7. The computer-implemented method of claim 6, further comprising:
determining the computing device is in motion; and
based on determining the computing device is in motion, initiating determining of the motion data.

8. The computer-implemented method of claim 6, wherein the motion data is determined using at least one of an accelerometer, an electronic gyroscope, an electronic compass, or an inertial sensor.

9. The computer-implemented method of claim 6, further comprising:
determining image data over the period of time,
wherein determining the motion data includes analyzing the image data.

10. The computer-implemented method of claim 6, further comprising:
determining the rotation data using an electronic gyroscope of the computing device; and
performing a mathematical integration of the rotation data to determine at least a portion of the motion data.

11. The computer-implemented method of claim 6, further comprising:
determining the acceleration data using an accelerometer of the computing device; and
performing a double mathematical integration of the acceleration data to determine at least a portion of the motion data.

12. The computer-implemented method of claim 6, wherein setting the functionality includes at least one of increasing or moving an action zone for enabling the user to provide input to the computing device.

13. The computer-implemented method of claim 6, further comprising:
providing a set of values adding up to one hundred percent, the set of values including at least two of a first confidence value that the computing device is being held in the left hand, a second confidence value that the computing device is being held in the right hand, a third confidence value that the computing device is concurrently held in both the left hand and the right hand, and a fourth confidence value that the computing device is located elsewhere.

14. The computer-implemented method of claim 6, wherein the confidence value is a single number between a first number and a second number, the first number representing full confidence that the computing device is being held in the right hand, the second number representing full confidence that the computing device is being held in the left hand.

15. The computer-implemented method of claim 6, further comprising:
determining a curvature of movement about a pivot point defined by a wrist of the right hand or the left hand.

16. The computer-implemented method of claim 6, wherein the regression includes at least one of a linear regression or a quadratic regression.

17. A computing device, comprising:
at least one processor;
at least one memory comprising instructions that, when executed by the at least one processor, cause the computing device to:
determine motion data over a period of time, the motion data associated with movement of the computing device, the motion data representing at least one of rotation data or acceleration data;
perform, using at least a portion of the motion data, a regression along a first axis with respect to at least a second axis;
determine, based at least in part on the regression, a set of motion features;
determine a confidence value associated with the set of motion features, the confidence value representing a likelihood that a user is holding the computing device in at least one of a left hand or a right hand;
determine the confidence value satisfies a confidence value threshold; and based at least in part on the confidence value satisfying the confidence value threshold, set functionality of the computing device.

18. The computing device of claim 17, wherein the at least one memory further comprises instructions that, when executed by the at least one processor, further cause the computing device to:
  determine the rotation data using an electronic gyroscope of the computing device;
  determine the acceleration data using an accelerometer of the computing device;
  perform a first mathematical integration of the rotation data to determine a first set of position data; and
  perform a second mathematical integration of the acceleration data to determine a second set of position data, the second mathematical integration involving a double mathematical integration,
  wherein the set of motion features is generated based at least in part on the first mathematical integration and the second mathematical integration.

19. The computing device of claim 17, wherein the set of motion features includes at least one of a direction of curvature, a mean over the period of time, a number of zero crossings, a kurtosis value, or a skew value.

20. The computing device of claim 17, wherein the confidence value is determined at least in part using a classifier algorithm, the classifier algorithm including at least one of a boosted decision stump algorithm, a decision tree algorithm, a random forest algorithm, or a neural net algorithm.

21. The computing device of claim 17, wherein the at least one memory further comprises instructions that, when executed by the at least one processor, further cause the computing device to:
  perform, using at least a portion of the motion data, a second regression along the second axis with respect to at least a third axis,
  wherein the set of motion features is further determined based at least in part on the second regression.

* * * * *